(12) United States Patent
Asseh et al.

(10) Patent No.: US 6,501,879 B1
(45) Date of Patent: Dec. 31, 2002

(54) OPTICAL COUPLER WITH A NEW GEOMETRY

(75) Inventors: Adel Asseh, Stockholm (SE); Mikael Bergman, Järfälla (SE); Anders Henriksson, Hässelby (SE); Bengt Sahlgren, Saltsjö-Boo (SE); Simon Sandgren, Stockholm (SE); Raoul Stubbe, Stocksund (SE)

(73) Assignee: Proximon Fiber Optics AB, Kista (SE)

( * ) Notice: Subject to any disclaimer, the term of this patent is extended or adjusted under 35 U.S.C. 154(b) by 0 days.

(21) Appl. No.: 09/617,090

(22) Filed: Jul. 14, 2000

(51) Int. Cl.⁷ .............................. G02B 6/34; G02B 6/293
(52) U.S. Cl. ............................................ 385/37; 385/18
(58) Field of Search .................................. 359/127, 130; 385/18, 16, 31, 37, 39, 47; 372/29.02, 99, 102

(56) References Cited

U.S. PATENT DOCUMENTS

| 4,466,694 A | 8/1984 | MacDonald |
| 4,725,110 A | 2/1988 | Glenn et al. |
| 5,016,967 A | 5/1991 | Meltz et al. |
| 5,042,897 A | 8/1991 | Meltz et al. |
| 5,061,032 A | 10/1991 | Meltz et al. |
| 5,307,437 A | 4/1994 | Facq et al. |
| 5,832,156 A | 11/1998 | Strasser et al. |
| 5,850,302 A | 12/1998 | Strasser et al. |
| 5,970,190 A | * 10/1999 | Fu et al. ....................... 385/37 |

OTHER PUBLICATIONS

"Narrow–Band Optical Channel–Dropping Filter", Journal of Lightwave Technology, vol. 10, No. 1, Jan. 1992, pp. 57–62.

* cited by examiner

Primary Examiner—Hemang Sanghavi
Assistant Examiner—Omar Rojas
(74) Attorney, Agent, or Firm—Birch, Stewart, Kolasch & Birch, LLP

(57) ABSTRACT

The invention is a spectrally selective optical coupler with a new geometry and a new principle of action. An optical coupler according to the invention includes an optical waveguide and an external resonator. In the waveguide, there is provided a deflector that is operative to deflect light of a predetermined wavelength into the external resonator. Coupling is enhanced by the deflected wavelength being resonant in the external resonator.

16 Claims, 3 Drawing Sheets

OPTICAL COUPLER WITH A NEW GEOMETRY

TECHNICAL FIELD

The present invention relates to an optical coupler with a new geometry and a new principle of action. The optical coupler provides spectrally selective coupling of light to or from a waveguide, such as an optical fibre.

TECHNICAL BACKGROUND

Spectrally selective optical couplers, also known as channel drop filters, are utilised for extraction of a single wavelength channel from a broadband optical signal, or for insertion of a single wavelength channel into a broadband optical signal. Typically, spectrally selective couplers are used in wavelength division multiplexed optical communications systems for adding and dropping a single wavelength channel.

Channel drop filters have previously been implemented as dual-waveguide couplers. The article "Narrow-Band Optical Channel-Dropping Filter", Journal of Lightwave Technology, vol. 10, no. 1, January 1992 (Haus et al.) describes an optical channel-dropping filter comprising a first and a second waveguide, the first of which contains a $\lambda/4$ shifted distributed feedback (DFB) resonator. Light propagating in the second waveguide is coupled to the first waveguide by evanescent coupling between the two waveguides. Only one wavelength of light is resonant in the first waveguide, and consequently only that wavelength of light is efficiently coupled to the first waveguide. By making the $\lambda/4$ shifted DFB resonator asymmetric (i.e. the grating is longer on one side of the $\lambda/4$ shift), light can be coupled out of the DFB resonator.

However, prior art channel drop filters have some significant drawbacks and limitations. The filters are difficult to manufacture, due to the fact that very precise placement of the waveguides is required, in order to obtain a reliable evanescent coupling. Furthermore, the prior art filters are difficult to control. The coupling strength and the coupled wavelength is, to a large extent, fixed once the device is assembled. Also, each filter needs to be of a certain size in order to achieve the necessary feedback. In particular, when a number of channels are to be dropped separately (e.g. when constructing a demultiplexer), the device needs to be quite large. Yet another problem with the prior art filters is that they are difficult to implement in a fibre configuration, since the evanescent coupling between the waveguides needs to be very accurate. Any perturbation of either of the waveguides can cause large uncontrolled changes in performance.

SUMMARY OF THE INVENTION

The present invention provides an optical coupler with a new geometry and a new principle of action, which eliminates, or at least alleviates, the aforementioned problems in the prior art.

An optical coupler according to the present invention comprises an optical waveguide, preferably an optical fibre, in which there is provided a deflector for deflecting at least some of the light, propagating in said waveguide, into an external resonator. By external resonator, it is meant that the resonator is defined by mirrors that are arranged outside the optical waveguide. The external resonator is arranged to be resonant to a predetermined wavelength. The resonance of the predetermined wavelength in the external resonator causes an energy build-up of said wavelength in said resonator. In effect, the coupling of the resonant wavelength is rendered much stronger than what is obtained by the deflector alone. Owing to this, the deflector can be made very weak, deflecting only a small fraction of the light in the waveguide. The resonant wavelength can, in a very advantageous way, be coupled out of the external resonator. Light of a wavelength that is not resonant in the external resonator is essentially unperturbed by the coupling, since only a very small fraction of the light in the waveguide is deflected by the deflector.

A general insight, forming a basis for the present invention, is that coupling of light is much more efficient and spectrally selective when performed resonantly. This fact is utilised in the present invention by arranging an external resonator outside an optical waveguide. In the waveguide, there is arranged a deflector, deflecting light into the external resonator. Consequently, light being resonant in the external resonator is more strongly coupled (by the deflector) between the waveguide and the resonator.

Hence, a very weak coupling factor can be used if the coupling is made in connection with a resonance to the wavelength at issue for coupling. Wavelengths not exhibiting resonance in the coupling region are essentially unperturbed, due to the very weak coupling factor for non-resonant wavelengths.

In one aspect, the present invention provides a spectrally selective optical coupler, comprising a waveguide with a deflector. The deflector is operative to deflect light from the light guiding structure of the waveguide into an external resonator, which external resonator is defined by two mirrors provided on opposite sides and outside of said light guiding structure. Light can be coupled out of the external resonator by either of the mirrors having a slightly reduced reflectivity, or by either of the mirrors being provided with an aperture of strongly reduced reflectivity (as compared to the reflectivity of the same mirror off said aperture).

In a preferred embodiment, the deflector comprises a periodic refractive index modulation in the light guiding structure of the waveguide. In the most preferred embodiment, this periodic refractive index modulation is a tilted optical Bragg grating. The tilted optical Bragg grating forms, effectively, a deflector comprising a cascaded series of very weak reflectors, each of which couples light into a single resonant mode in the external resonator.

In another aspect, the present invention provides a spectrally selective optical coupler that is tuneable, thus allowing coupling of different wavelengths at different instants by tuning said coupler. This is obtained by at least one of the mirrors defining the external resonator being adjustable, as to distance between the mirrors or to resonator angle with respect to the light guiding structure of the waveguide. By tilting the external resonator with respect to the light guiding structure, the inventive optical coupler can also be made to pass all wavelengths.

In yet another aspect, the present invention provides optical couplers with external resonators, in which the propagation direction of light is essentially perpendicular with respect to the light guiding structure of the waveguide. Thus, the spectrally selective optical couplers according to the present invention can easily be cascaded, in order to achieve coupling of different wavelengths at different positions. This is obtained by arranging a plurality of optical couplers in series, each coupler of said plurality of optical couplers being resonator to a different wavelength.

It will be appreciated by those skilled in the art that the features of the present invention governing the coupling of light out of an optical waveguide are equally applicable to the coupling of light into an optical waveguide, since the latter is merely the time reversal of the former.

According to the invention, the deflector that is used to deflect light into the external waveguide can be wavelength discriminating. However, the spectral selectivity of the deflector need not be very high, since spectral selectivity is mainly achieved by means of the external resonator. Nevertheless, in some cases, it might be desirable to have a degree of spectral selectivity in the deflector. This is easily achieved by using a deflector comprising a tilted or a transversally asymmetric Bragg grating, which is adapted for deflection of a predetermined wavelength in a predetermined direction. Generally, the deflected wavelength and its deflection angle are determined by the period of the Bragg grating.

In a transversally asymmetric Bragg grating, the amplitude (modulation depth) is lower at one edge of the grating (radially) than at the opposite edge. This means that when light is reflected against the grating it will have a direction of propagation which is somewhat different from the direction of incidence. If the transversal modulation depth variation is sufficiently large it will be possible to couple light to and from the waveguide with the aid of the transversally asymmetrical phase grating.

In other embodiments, the deflector comprises a surface roughness of the light guiding structure. For example, the surface roughness can be periodic grooves or other light-deflecting means. Also, the mirrors defining the external resonator can be provided with a surface roughness of this kind, to couple out light from the resonator.

One advantage of the optical coupler according to the present invention is that the coupler can be made very compact. The external resonator can advantageously be arranged in such a way that the light in the resonator propagates in a direction perpendicular to the light in the waveguide (sometimes in this application, this is referred to as the external resonator being perpendicular to the waveguide). Thus, light can easily be coupled to or from the waveguide perpendicularly. It will be appreciated that perpendicular coupling of light to or from a waveguide is the most compact way of coupling.

Another advantage of optical couplers according to the present invention is that a plurality of couplers can be arranged in series in a simple manner, thereby facilitating coupling of different wavelengths at different positions along the waveguide.

Yet another advantage of the present invention is its sturdiness. The deflector is incorporated into the waveguide and cannot be tampered with. In the case of the waveguide being an optical fibre, the mirrors defining the external resonator can conveniently be deposited onto the outer surface of the fibre cladding. However, and as known in the art, the curvature of the mirrors must match the waist of the resonator mode in the fibre core. In this case, tuning of the resonator wavelength is obtained by pressing the mirrors, i.e. the cladding. Alternatively, one or both of the mirrors can be separate from the cladding, in which case tuneability is even more easily achieved.

Furthermore, the geometry of the optical coupler according to the invention is very favourable for fibre based applications. It is envisioned that the two mirrors defining the external resonator actually are comprised of a single circumferential reflector, extending fully or partly around the fibre cladding. In such situation, a first part of said reflector constitutes the first mirror, and a second part of said reflector constitutes the second mirror. The requirement being that said two parts still defines a resonator. Typically, the first part and the second part of the reflector (i.e. the first and the second mirror) are opposed to each other, thereby being essentially parallel.

Since the inventive coupler can be made very small, temperature control of the components is more easily achieved. A small size also alleviates the relative precision requirements on the device.

BRIEF DESCRIPTION OF THE DRAWINGS

In the following, the invention will be described in greater detail with reference to the accompanying drawings, on which.

DETAILED DESCRIPTION OF PREFERRED EMBODIMENTS

Figure 1:
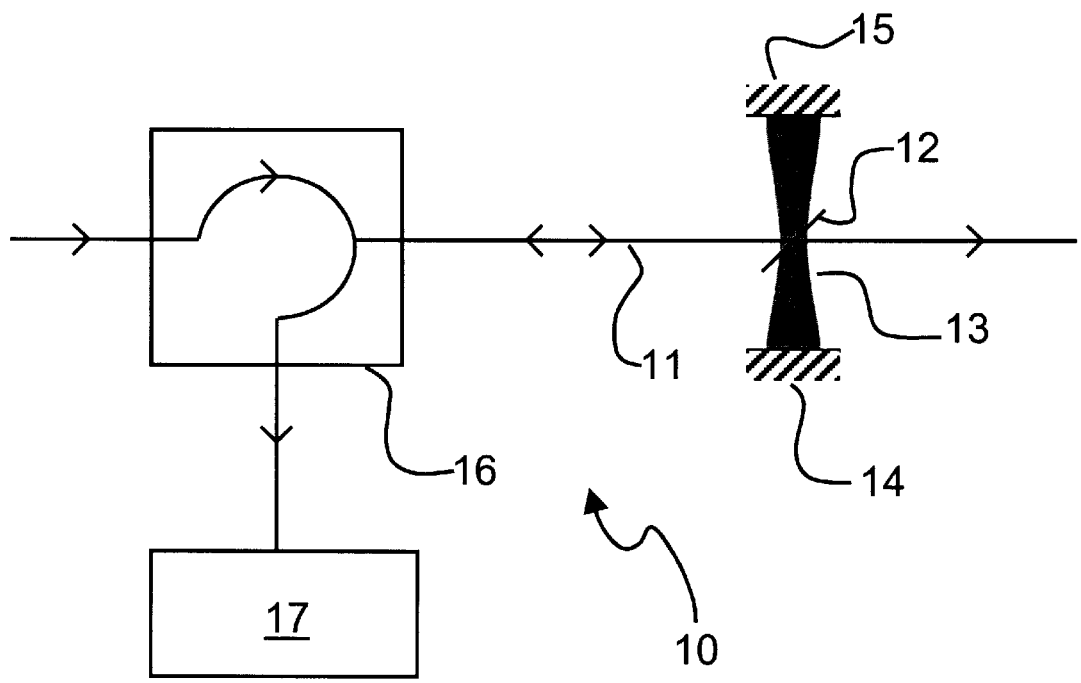
FIG. 1 shows schematically a tuneable add/drop filter comprising an optical coupler according to the present invention.

The present invention provides a spectrally selective optical coupler, also known as a channel drop filter. The invention will be described with respect to some preferred embodiments, as shown on the drawings. In the following detailed description, the optical coupler according to the invention is primarily described in terms of coupling of light out of a waveguide, e.g. an optical fibre. Nevertheless, it will be appreciated that the same explanations apply for coupling of light into a waveguide, since this is simply the time reversal of the former.

A first preferred embodiment of the present invention will now be described with reference to FIG. 1. The spectrally selective optical coupler 10 shown in FIG. 1 comprises an optical single mode fibre 11, in the core of which there is provided a deflector 12 comprised of a periodic refractive index modulation, also known as an optical Bragg grating. (For clarity, this is illustrated in the figure as one single surface 12. Although the surface 12 in the figure extends outside the fibre, it is understood that this is purely for illustrative purposes, and that the Bragg grating actually is situated entirely inside the fibre 11.) The optical Bragg grating 12 is tilted with respect to the fibre core, in the sense that boundaries between domains of the Bragg grating are non-parallel to the electromagnetic field of light propagating in the fibre 11, i.e. not perpendicular to the propagation direction of light in the fibre. The deflector 12 is operative to deflect light propagating in the core of the optical fibre into an external resonator 13. The external resonator 13 is defined by a first and a second mirror 14 and 15, both provided outside the fibre 11. In this preferred embodiment, the mirrors 14 and 15 are essentially parallel to the fibre core, thereby defining a resonator, in which the propagation direction of light is essentially perpendicular to the propagation direction in the fibre 11. Since propagation of light is time invariant, the deflector 12 is also, of course, operative to deflect light from the external resonator 13 into the fibre 11.

In order to understand the spectral selectivity of the inventive optical coupler 10, its principle of action will now be described in greater detail.

Each of the domains, making up the Bragg grating, act as a very weak mirror (due to normal Fresnel reflection at a refractive index boundary) reflecting normally about $10^{-4}$ of the incident light. In effect, a small fraction of the light propagating in the optical fibre is deflected. Due to the collective action of a plurality of domains in the Bragg grating, different wavelengths are deflected in slightly different directions. The reason for this being superposition of the diffraction patterns from each refractive index boundary, as known in the art.

The external resonator 13 is carefully arranged with respect to the Bragg grating 12, and hence to the refractive index boundary, so that the deflected light of a desired wavelength enters a resonant mode in the external resonator 13. Although the deflector 12 only deflects a very small fraction of the light into the external resonator 13, a strong field will build up inside the resonator. The build-up of a strong field in the external resonator reinforces the coupling of light into the resonator. Now, a very important feature of the present invention, which applies to all embodiments thereof, is that the external resonator 13 is only resonant to specific wavelengths. This means that, even if the deflector 12 is essentially non-discriminating in terms of wavelength, only the wavelengths being resonant in the external resonator experience the reinforcement of coupling described above. A discrete set of wavelengths is resonant in the external resonator, as determined by the free spectral range of the resonator. By making the free spectral range of the external resonator large enough, only one wavelength is deflected by the deflector in a direction such that it enters a resonant mode in the external resonator.

Alternatively, the deflector 12 can be arranged to deflect essentially all light into the external resonator 13. In this case, the free spectral range of the external resonator 13 is preferably larger than the entire wavelength range of the optical signal at issue, in order to ensure that only one wavelength channel is resonant in the external resonator 13.

If the losses in the external resonator 13 are small enough, all light coupled into the external resonator will be coupled back into the optical fibre 11 with a reversed propagation direction, i.e. the light will effectively be reflected back into the optical fibre 11 in opposite direction to the incident light. This means that light of a specific wavelength (viz. the wavelength to which the external resonator 13 is resonant) is retro-reflected by the optical coupler 10, as shown in FIG. 1.

In order to extract the retro-reflected wavelength, there is provided an optical circulator 16 in the light path prior to the optical coupler 10, as shown in FIG. 1. Any retro-reflected light is extracted by the optical circulator 16 and sent to other peripherals 17, such as another optical fibre, or a photodetector.

In FIG. 1, the optical signal is shown to propagate from left to right in the optical fibre 11, and a desired wavelength component of this light is coupled back by the optical coupler 10 and extracted by the optical circulator 16. However, and as pointed out earlier, the situation is equivalent if time is reversed (a fact that applies to all optical phenomena). It is therefore appreciated that light can equally well be coupled into the optical fibre by the same arrangement. Note, however, that the optical signal in the optical fibre 11 then propagates from right to left, and the optical circulator 16 operates in reverse sense, as compared to the above description.

The arrangement described above, and schematically shown in FIG. 1, is preferred if only one wavelength channel is to be dropped from or added to the optical signal. However, and since the above described coupler requires one optical circulator for each wavelength to be dropped, a second embodiment is preferred if several wavelengths are to be dropped or added. This second embodiment will now be described in detail, with reference being made to FIG. 2.

The second embodiment of the optical coupler 20 comprises a first and a second external resonator 21 and 22 in series, the two resonators jointly constituting a complete, spectrally selective optical coupler according to the present invention.

In this case, light is coupled out of the first external resonator 21 through one of the mirrors 211 and 212 defining said first resonator. If the deflector 210 deflects 1 percent of the incident light, and the mirror 212 have a transmittance of 2 percent, then 50 percent of the incident light from the fibre 11 will exit the resonator 21 through the transmitting mirror. At the same time, 25 percent is, à priori, reflected back in the opposite direction in the fibre 11, and 25 percent is passed through the coupler in the forward direction towards the second external resonator 22.

The second external resonator 22 is defined by two mirrors 221 and 222, both of which are essentially non-transmitting. In effect, the second external resonator 22 will act as a retro-reflector in the same manner as described in connector with FIG. 1. Consequently, the 25 percent that passed through the first resonator 21 will be retro-reflected by the second resonator 22, and hence incident again on the first resonator 21, now from the opposite direction. By controlling the phase relation between the retro-reflected light incident on the first resonator 21 and the fraction of the originally incident light reflected by the first resonator, destructive interference can be obtained in the backwards direction. The result is then that light exhibiting resonance in the two resonators 21 and 22 is coupled out of the first resonator 21 through the transmitting mirror 212. Preferably, the phase relation is controlled by introducing an interruption of the inclined Bragg grating between the two resonators.

Hence, the first and the second external resonator 21 and 22, and the associated deflectors 210 and 220, together form a complete spectrally selective optical coupler 20. Light of a desired wavelength is conveniently coupled out of the optical fibre 11, i.e. extracted from the optical signal, by means of the coupler schematically shown in FIG. 2.

In other embodiments, other fractions are passed and reflected. However, it is an important advantage of the present invention that light of the desired wavelength can be effectively blocked by the spectrally selective coupler, in that no light of the desired wavelength passes through the device.

Figure 2:
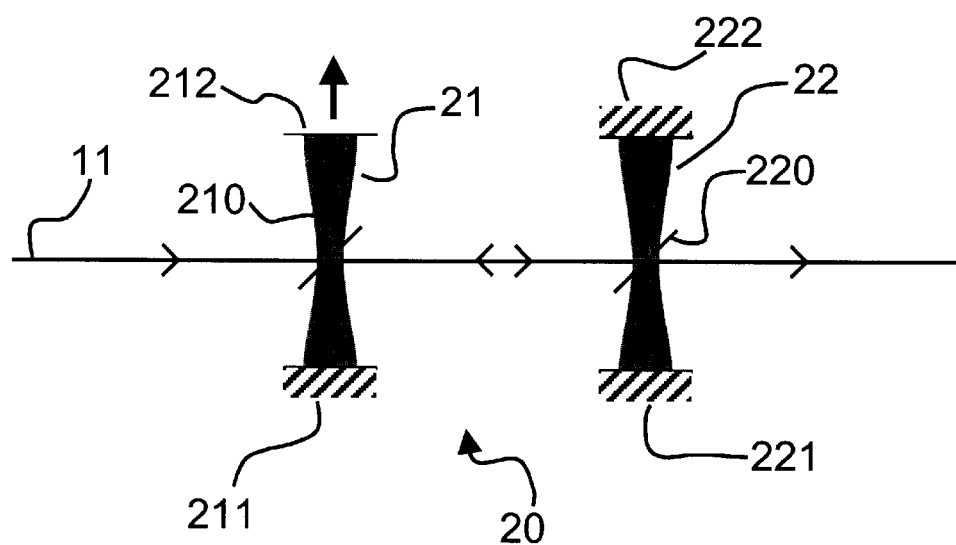
FIG. 2 shows schematically a tuneable and cascadeable add/drop filter comprising an optical coupler according to the present invention.
Figure 3:
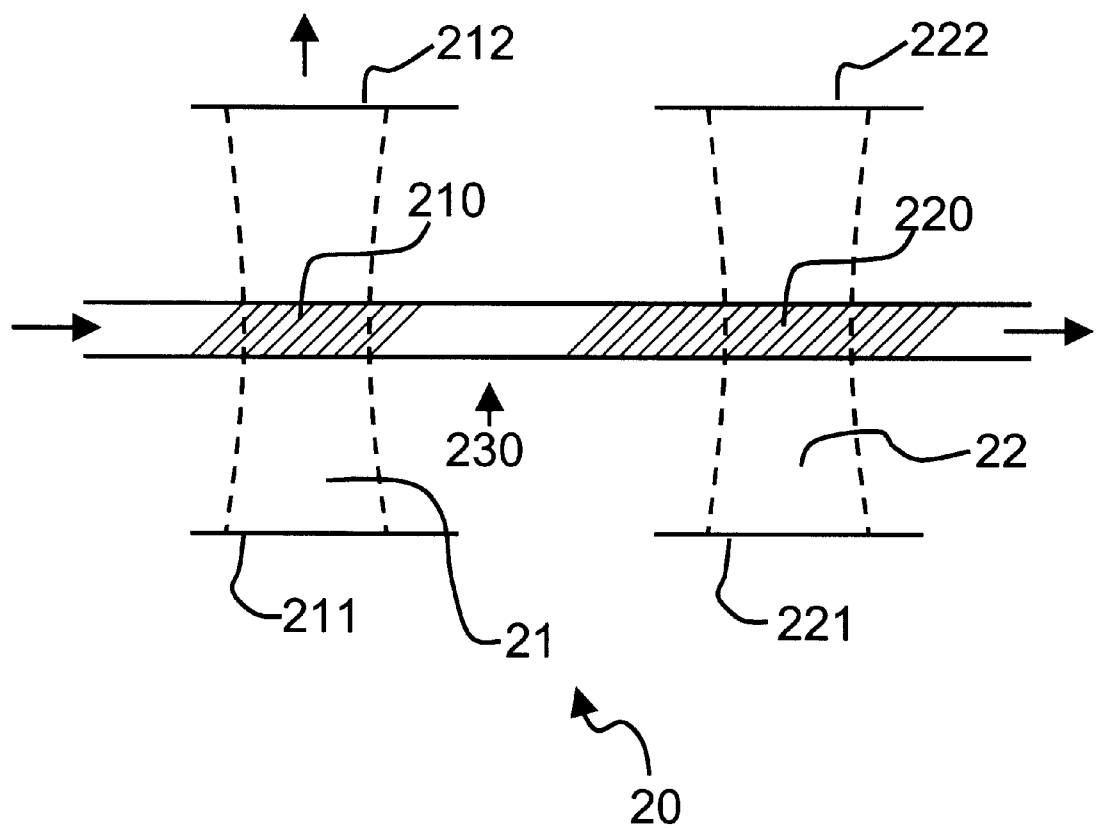
FIG. 3 shows schematically a magnified picture of the cascadeable add/drop filter shown i FIG. 2.

FIG. 3 shows, in greater detail, the complete spectrally selective optical coupler of FIG. 2. In FIG. 3 the periodic refractive index modulation 210, 220 and the grating interruption 230 are apparent. As described above, the grating interruption 230 introduces the necessary phase shift of the retro-reflected light from the second resonator 22 to provide destructive interference between this retro-reflected light and the light retro-reflected from the first resonator 21, thereby forcing this wavelength (i.e. the resonant wavelength) to exit through the transmitting mirror 212 of the first resonator 21. Recall that, in the exemplary embodiment, 25 percent of the originally incident light is retro-reflected, and 25 percent is passed, at the first resonator 21. The 25 percent passed at the first resonator 21 is now caused to interfere destructively with the light originally reflected, thereby eliminating any reflected light. Consequently, light of the resonant wavelength must exit through the transmitting mirror 212 of the first resonator 21. By this arrangement, no light of the resonant wavelength remains in the fibre 11 (and hence not in the optical signal) downstream. The spectrally selective optical coupler 20 act as a blocking for the desired wavelength.

It will be appreciated that a plurality of optical couplers 20, i.e. resonator pairs as shown in FIG. 2, can be cascaded, in order to provide coupling of different wavelengths at different positions along the optical fibre 11.

Tuneability of the spectrally selective optical coupler 10, 20 according to the present invention is easily achieved by changing the distance between the mirrors defining the resonator (thereby changing the wavelength to which the resonator is resonant) and/or by tilting the external resonator with respect to the deflector (as described above, different wavelengths are deflected in slightly different directions). Note that, as the distance between the mirrors is changed, resonance to a specific wavelength is obtained periodically (in terms of resonator length). Appropriate mounting for the mirrors, in order to achieve said tuneability, will be provided by those of ordinary skill in the art.

The spectral resolution (selectivity) of the optical coupler according to the present invention is determined by the finesse of the external resonator. As known in the art, the finesse is the spectral width of the resonant wavelength in the resonator. The higher the finesse is, the smaller is the resonant wavelength range. A high finesse, and hence a high spectral resolution, is obtained by having low losses in the external resonator.

The deflecting power of the deflector, comprised of a tilted Bragg grating, of this embodiment is dependent on the polarisation of the incident light. Most optical fibres used for communications are non-polarisation preserving and, therefore, measures have to be taken in order to take care of any polarisation. In this embodiment, and in accordance with the present invention, this is achieved by utilising two tilted Bragg gratings. One of the two tilted Bragg gratings is rotated 90 degrees relative the other. Effectively, one polarisation direction is deflected by one of the gratings, and the other polarisation direction is deflected by the other grating. It should be noted that said two tilted Bragg gratings can be, and preferably are, superimposed in the same region of the optical fibre.

Figure 4:
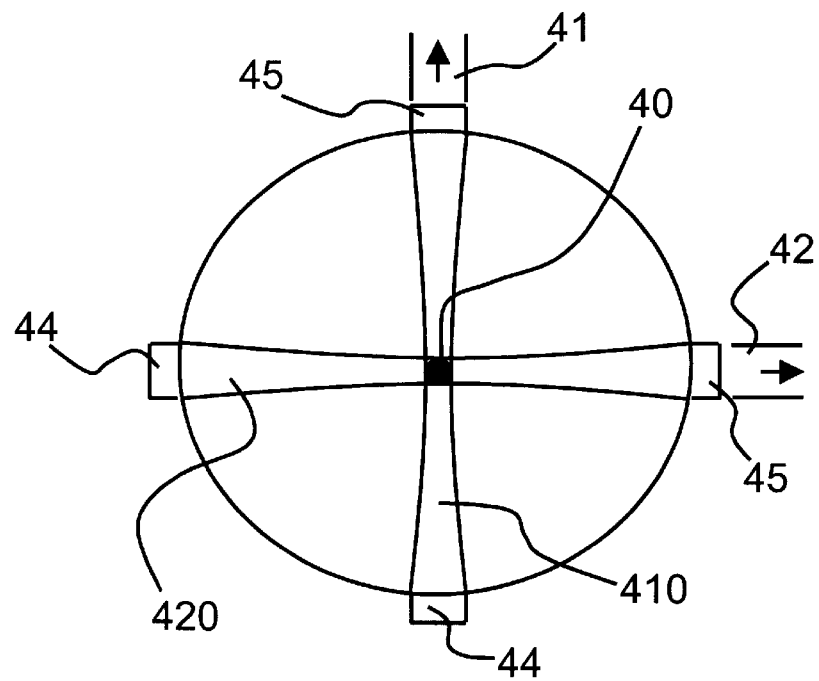
FIG. 4 shows schematically a transverse picture of a first embodiment of a coupler with two deflectors.

FIG. 4 shows a first preferred arrangement for coupling light out of an optical coupler with two deflectors. In this arrangement, light is coupled out of the optical coupler in two lobes 41, 42, each lobe with a different polarisation. A first tilted Bragg grating (not shown) is inscribed into the core 40 of the optical fibre. This first Bragg grating is operative to deflect a first polarisation component into a first external resonator 410. A second tilted Bragg grating (not shown) is inscribed into the same region of the fibre core. This second Bragg grating is operative to deflect a second polarisation component into a second external resonator 420. The second Bragg grating is rotated 90 degrees with respect to the first Bragg grating, as indicated in the figure, thus deflecting light in a direction normal to the light deflected by said first Bragg grating. Both the first external resonator 410 and the second external resonator 420 are defined by one highly reflecting mirror 44, and one slightly transparent mirror 45 each, in accordance with the earlier description.

Although the two Bragg gratings, in this embodiment, are inscribed into the same region of the fibre, it is, of course, possible to have the two Bragg gratings in separate portions of the fibre.

Figure 5:
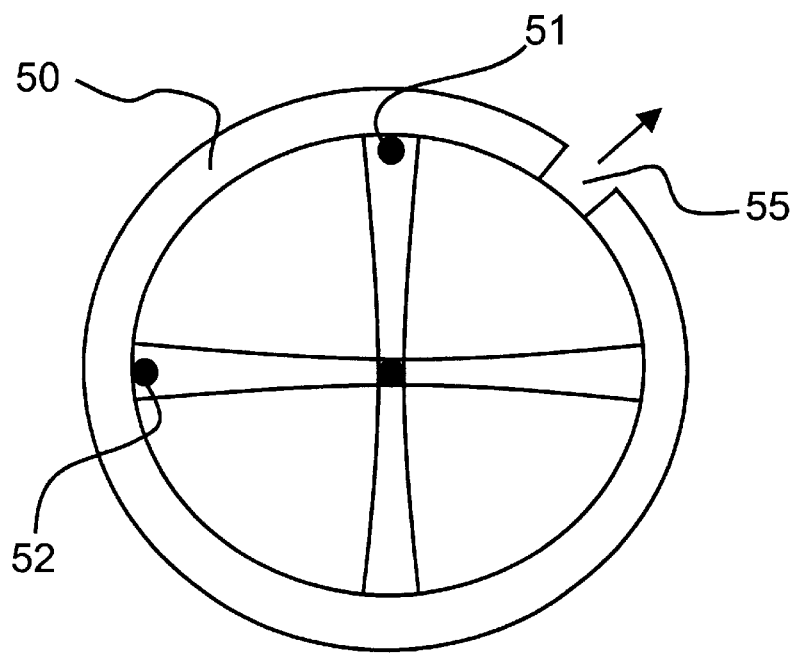
FIG. 5 shows schematically a transverse picture of a second embodiment of a coupler with two deflectors.

FIG. 5 shows a second preferred arrangement for coupling light out of an optical coupler with two deflectors. In the second arrangement, the full circumference of the fibre is covered by a reflector 50 (thickness exaggerated for clarity). At one reflection point of each of the two resonant modes (one of each polarisation), there are provided scattering centres 51, 52. Light is scattered by these scattering centres, and is thus reflected randomly inside the circumferential reflector 50. In the reflector 50, there is provided an aperture 55, through which light exits the fibre. Since light of both polarisations has been blended by the random reflectors inside said reflector, the output through this aperture is non-polarised (i.e. a mixture of both polarisation directions).

Generally, and applicable to all embodiments, it is conceivable and preferred that the light guiding structure of the present invention is provided with a supporting Bragg grating, superimposed on the deflector. The modulation depth of said supporting Bragg grating is deep enough to provide resonance to a specific wavelength within a corresponding portion of the light guiding structure. Note that this resonance is different from the resonance provided by the external resonators, and that the supporting Bragg grating is a plane (i.e. non-tilted) grating. A plane grating is a prerequisite for obtaining resonance. The deflector of the present invention is conveniently placed within the resonance provided by the supporting Bragg grating, whereby the coupling to the external resonator is enhanced dramatically. It is preferred that the supporting Bragg grating is a chirped Bragg grating, thereby providing resonance to different wavelengths at different portions of the light guiding structure. This Bragg grating, providing resonance to different wavelengths in different portions of the light guiding structure, is comprehensively disclosed in the co-pending U.S. application entitled "Optical Coupling" filed on Jun. 30, 2000, which is hereby in its entirety incorporated by reference.

The invention has been described with the aid of some preferred embodiments as shown on the drawings. Nevertheless, it will be understood by those of ordinary skill in the art that numerous modifications and alterations of the described embodiments, as well as other embodiments, are conceivable within the scope of the invention. The scope of the invention is defined in the claims.

What is claimed is:

1. A spectrally selective optical coupler, comprising:
   an optical fiber having a light guiding core arranged to guide light along a predetermined path;
   an external resonator defined by a first and a second mirror, said first and said second mirrors being provided on opposite sides and outside of said light guiding core, and said external resonator being resonant to a specific wavelength; and
   a deflector provided in said optical fiber, the deflector being operative to partly deflect light propagating in said light guiding core into said external resonator, wherein the deflector comprises a periodic refractive index modulation inscribed into the light guiding core of the fiber.

2. The optical coupler according to claim 1, wherein the deflector comprises a tilted optical Bragg grating.

3. The optical coupler according to claim 1, wherein the deflector comprises a transversally asymmetric optical Bragg grating.

4. The optical coupler according to claim 1, wherein either one of the first and the second mirror is a dielectric multi-layer mirror.

5. The optical coupler according to claim 1, wherein the propagation direction of light in the external resonator is essentially perpendicular to the propagation direction of light in the light guiding structure of the optical waveguide.

6. The optical coupler according to claim 1, further comprising a second external resonator and a dedicated deflector for said second external resonator, the optical coupler thereby having two deflectors, each of said deflectors deflecting a different polarisation of light.

7. The optical coupler according to claim 3, wherein the deflectors are provided in a common region of the waveguide, said deflectors thus being superimposed in said waveguide.

8. The optical coupler according to claim 7, wherein both external resonators are defined by a circumferential reflector, a first and a second part of which constitutes the mirrors defining the first resonator, and a third and a fourth part of which constitutes the mirrors defining the second resonator.

9. The optical coupler according to claim 6, wherein the circumferential reflector is highly reflective except in a specific output region, and scattering centers are provided in the first and the second resonators, said scattering centers being operative to scatter light from the resonant modes into a common scattering mode confined by said circumferential reflector, light of both polarizations thereby being blended in the scattering mode and subsequently output through said output region of said circumferential reflector as non-polarized light.

10. The optical coupler according to claim 1, wherein one of said mirrors is provided with a reduced reflectivity, thereby facilitating external coupling of light to or from the resonator.

11. The optical coupler according to claim 1, wherein one of the mirrors is provided with an aperture of strongly reduced reflectivity, as compared to the reflectivity of said mirror outside said aperture, thereby facilitating external coupling of light to or from the resonator.

12. The optical coupler according to claim 1, further comprising a supporting optical Bragg grating in the light guiding structure, said supporting Bragg grating creating a region of local resonance within said light guiding structure to a predetermined wavelength, thereby locally increasing the coupling strength for said predetermined wavelength.

13. The optical coupler according to claim 12, wherein the supporting Bragg grating is a chirped Bragg grating, creating local resonance to different wavelength components at different regions of said chirped Bragg grating.

14. The optical coupler according to claim 1, wherein the wavelength, to which the external resonator is resonant, is adjustable, the spectrally selective coupler thereby being tuneable.

15. The optical coupler according to claim 1, wherein at least one of the mirrors defining the external resonator is adjustably mounted, whereby either of the distance between the first and the second mirror, and the angle of said mirrors with respect to the light guiding structure can be adjusted.

16. A spectrally selective optical coupler, comprising:
- an optical fiber having a light guiding core arranged to guide light along a predetermined path;
- a first external resonator defined by a first and second mirror, said first and said second mirror being provided on opposite sides and outside of said light guiding core, and said first external resonator being resonant to a specific wavelength;
- a first deflector provided in said core, the first deflector being operative to deflect light propagating in said core into said first external resonator;
- a second external resonator defined by a third and a fourth mirror, said third and said fourth mirrors being provided on opposite sides and outside of said light guiding core, and said second external resonator being resonant to the same wavelength as said first external resonator; and
- a second deflector provided in said core, the second deflector being operative to deflect light propagating in said core into said second external resonator, said third and said fourth mirrors being highly reflective, and said first or said second mirror being partly transmitting, thereby providing output of said resonant wavelength.

* * * * *

UNITED STATES PATENT AND TRADEMARK OFFICE
CERTIFICATE OF CORRECTION

PATENT NO. : 6,501,879 B1
DATED : December 31, 2002
INVENTOR(S) : Adel Asseh et al.

It is certified that error appears in the above-identified patent and that said Letters Patent is hereby corrected as shown below:

<u>Title page,</u>
Item [73], Assignee, please correct the name from "Proximon Fiber Optics AB" to
-- Proximion Fiber Systems AB --.

Signed and Sealed this

Twenty-second Day of March, 2005

JON W. DUDAS
*Director of the United States Patent and Trademark Office*